C. P. HASSELGREN.
FLY TRAP.
APPLICATION FILED APR. 5, 1918.

1,289,466.

Patented Dec. 31, 1918.

Inventor
Carl P. Hasselgren.
By Geo. Stevens.
Attorney

UNITED STATES PATENT OFFICE.

CARL P. HASSELGREN, OF SUPERIOR, WISCONSIN, ASSIGNOR TO MONITOR FLY TRAP COMPANY, OF SUPERIOR, WISCONSIN, A CORPORATION OF WISCONSIN.

FLY-TRAP.

1,289,466.    Specification of Letters Patent.    Patented Dec. 31, 1918.

Application filed April 5, 1918. Serial No. 226,876.

*To all whom it may concern:*

Be it known that I, CARL P. HASSELGREN, citizen of the United States, residing at Superior, in the county of Douglas and State of Wisconsin, have invented certain new and useful Improvements in Fly-Traps, of which the following is a specification, reference being had therein to the accompanying drawing.

This invention relates to fly traps.

The principal object sought is efficiency while other objects are simplicity of construction and the production of a trap so formed as to be readily knocked down and nested for shipment so as to occupy as little space as possible and also to be easily separable for cleansing purposes.

Still other advantages and objects of the peculiar construction will appear in the further description of the invention.

In the accompanying drawings forming part of this application and in which like reference characters indicate like parts:

Figure 1:
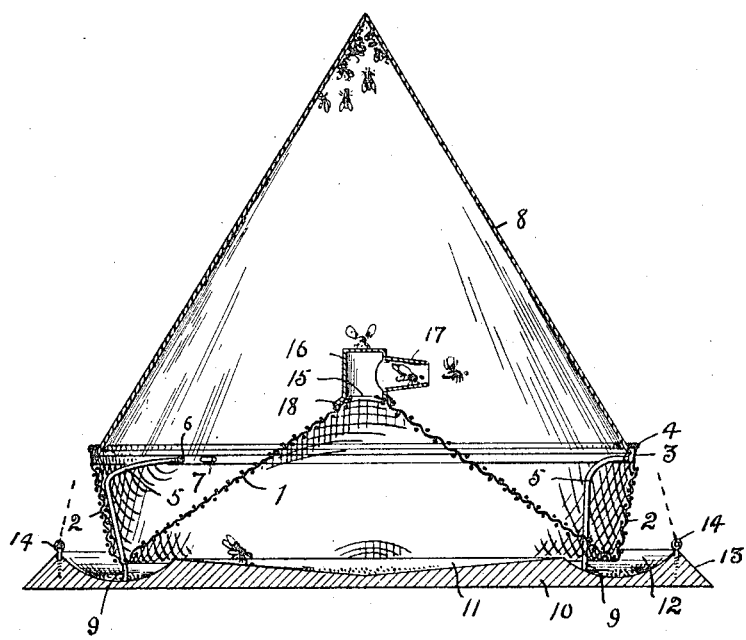
Figure 1 is a vertical central sectional view of one embodiment of the invention.
Figure 2:
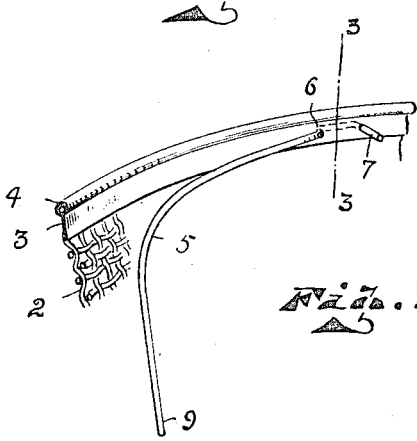
Fig. 2 is a perspective view of a fragmental portion of the reinforcing band illustrating the attachment of one of the resilient supporting legs thereto.
Figure 3:
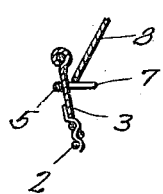
Fig. 3 is a vertical sectional view taken on the line 3—3 Fig. 2 showing the relation of the end of the supporting leg to the band and the cone.

The base of the trap is preferably composed of a single piece of suitable wire netting, the central portion 1 thereof being conically shaped and terminating about its lower edge in an upwardly extending flaring circumferential wall 2, the upper edge of which is reinforced by the metal band 3 having a bead 4 formed therein.

Into the band 3 is fastened one end of each arched resilient supporting leg 5, the latter being composed of a piece of substantially L-shaped spring wire. Such fastening is accomplished by passing the end of the wire through the band from the inside as at 6 and then within a short distance, returning it through the band and allowing it to project inwardly as at 7.

These projecting ends 7 form supports upon which the conically shaped celluloid upper portion 8 of the trap rests and there are preferably employed three such legs as being a convenient and satisfactory number.

The substantially horizontal slightly arched portions of the legs are wherein the resiliency lies. The free ends 9 project downwardly through the angle formed by the walls 1 and 2 in the base, engage the surface upon which the trap rests and receive the weight thereof.

In the drawings I have shown a circular tray 10 on which the trap may be placed if desired and which may prove especially convenient when the trap is suspended from above.

I prefer to form a central concave portion 11 in the tray in which is placed suitable bait such as sugar or the like and to form about this concave center and adjacent the edge of the tray a deeper narrow concave edge or groove 12 in which the legs of the trap rest, the angle 1—2 of the base occurring directly thereover. Into this groove 12 bait may be placed.

The outer circumferential edge of the tray is inclined as at 13 to form convenient approach to the trap for the flies, and means for suspending the trap are shown at 14.

The usual exit opening 15 is formed in the apex of the cone 1 and this is surrounded by a transparent exit turret comprising the vertical cylindrical central portion 16 and the radially extending tapering exit tube 17. The upper end of the central portion 16 is closed and the lower end preferably flared outwardly as at 18 to rest securely upon the end of the cone 1 and if desired, may be attached thereto in any convenient manner.

This turret is preferably made of celluloid and, as is evident, will practically insure against the return of a fly having once entered the trap therethrough.

The base of the cone 8 is made slightly larger than the inside diameter of the bead 4 and the cone being of a resilient material, may be readily forced downwardly inside of the bead where it rests upon the inwardly projecting ends 7 of the legs and against the inner wall of the band, thus providing simple means whereby the two portions of the trap are firmly united for all ordinary purposes though quickly and readily separable for emptying or cleansing the trap.

The sides 2 of the base of the trap are made flaring to permit of their nesting conveniently with similar trap bases and the ends 7 of the legs do not protrude inwardly far enough to interfere materially with such nesting.

While I have shown the tray 10 as forming a convenient support for the trap, it is understood that the same is not at all essential to the successful operation thereof when not suspended as the trap may operate equally as well when resting directly upon any smooth surface.

The resiliency of the legs 5 is to permit of the trap being readily depressed when an observer cares to frighten any flies which might have gathered thereunder, up into the trap, and which may be resorted to at any time as a profitable form of amusement.

I am aware that somewhat similar fly traps have been invented and having similar objects in view, however, this peculiar combination results is what is considered decided improvements in the art.

It is old to make fly traps having a foraminous base and transparent dome and this combination is very essential in a successful trap, but for the want of the use of proper material and peculiar shaping of parts in such combination, these traps have, to a large extent proven impractical.

It is apparent that a trap of this type made with a glass dome or upper portion would be very clumsy and heavy, that it would be subject to breakage in tipping over or falling and quite top heavy compared to the light and practically indestructible combination I have devised.

It may be stated that the object of the transparent upper portion is to form the least visional obstruction possible above the cone 1 through which the flies look as they seek escape and which encourages them to continue on upward within the cone.

Having thus described my invention, what I claim and desire to secure by Letters Patent, is:

1. The combination with a fly trap having a conically shaped base with an entrance opening in the apex thereof, of a transparent turret surmounting the apex and a radially extending entrance tube fixed to the turret.

2. In a fly trap of the character described, the combination with a conically shaped foraminous base having an upturned outwardly inclined circumferential wall, a band about the upper edge of the wall, an enlarged reinforcement about the upper edge of the band and a conically shaped transparent resilient upper portion resting within the reinforcing rim and against the inclined wall of the band.

3. A fly trap comprising a foraminous base having a conically shaped central portion and flaring upturned sides, angularly shaped resilient wire legs fixed adjacent the upper edge of the flaring sides and extending downwardly through the base, portions of the upper ends of the legs extending inwardly from the flaring sides forming a support for the upper portion of the trap, and a transparent resilient upper portion fitting within the upper edge of the flaring sides and resting upon the inwardly projecting ends of the legs substantially as described.

In testimony whereof I hereunto affix my signature in the presence of two witnesses.

CARL P. HASSELGREN.

Witnesses:
F. H. CORNELL,
S. GEO. STEVENS.